United States Patent [19]

Hemmeke et al.

[11] Patent Number: 4,783,111

[45] Date of Patent: Nov. 8, 1988

[54] VISOR

[75] Inventors: Ronald L. Hemmeke; Scott A. Spykerman, both of Holland, Mich.

[73] Assignee: Prince Corporation, Holland, Mich.

[21] Appl. No.: 866,272

[22] Filed: May 23, 1986

[51] Int. Cl.⁴ .............................................. B60J 3/02
[52] U.S. Cl. ................... 296/97.8; 296/97.11; 248/223.4; 16/335; 160/228
[58] Field of Search .................. 296/97 R, 97 B, 97 C, 296/97 G, 97 F, 97 H, 97 K; 248/223.4, 224.4; 16/335, 341, 342; 160/222, 226, 228

[56] References Cited

U.S. PATENT DOCUMENTS

| | | | |
|---|---|---|---|
| 1,599,183 | 9/1926 | Phillips | 296/97 K |
| 1,898,276 | 2/1933 | Van Dresser | 296/97 R |
| 1,932,475 | 10/1933 | Peteler | 160/29 |
| 1,941,032 | 12/1933 | Knowles | 248/276 |
| 2,107,247 | 2/1938 | Johnson | 296/97 G |
| 2,120,892 | 6/1938 | Francis | 160/211 |
| 2,201,197 | 5/1940 | Minor, Jr. | 296/97 C |
| 2,261,881 | 11/1941 | Horstmann | 296/97 C |
| 2,276,585 | 3/1942 | Mandel | 296/97 C |
| 2,414,340 | 1/1947 | Spraragen | 296/97 K |
| 2,492,074 | 12/1949 | Thompson | 160/213 |
| 2,517,872 | 8/1950 | Hamel | 296/97 A |
| 2,596,873 | 5/1952 | Solmes | 296/97 G |
| 2,628,008 | 2/1953 | Innis | 224/282 |
| 2,634,161 | 4/1953 | Beets | 296/97 K |
| 2,667,222 | 1/1954 | McCarthy et al. | 160/211 |
| 2,695,193 | 11/1954 | Hamel | 296/97 K |
| 2,823,950 | 2/1958 | Harris | 296/97 C |
| 2,829,920 | 4/1958 | Cohen | 296/97 G |
| 2,831,725 | 4/1958 | Chester | 296/97 G |
| 2,869,922 | 1/1959 | Chester | 296/97 G |
| 2,921,813 | 1/1960 | Lowry | 296/97 C |
| 2,932,539 | 4/1960 | Galbraith | 296/97 B |
| 2,948,566 | 8/1960 | Massey | 296/97 C |
| 2,965,415 | 12/1960 | Dryden | 296/97 K |
| 2,978,274 | 4/1961 | Ordman | 296/97 B |
| 2,999,718 | 9/1961 | Handler | 296/97 K |
| 3,016,262 | 1/1962 | Hunt | 296/97 C |
| 3,032,371 | 5/1962 | Berridge et al. | 296/97 K |
| 3,191,986 | 6/1965 | Simon | 296/97 K |
| 3,328,071 | 6/1967 | Johnson | 296/97 R |
| 3,369,837 | 2/1968 | Metier | 296/97 C |
| 3,403,937 | 10/1968 | Quaine | 296/97 R |
| 3,428,360 | 2/1969 | Honor, Sr. | 296/97 C |
| 3,480,322 | 11/1969 | Pollak | 296/97 C |
| 3,499,679 | 3/1970 | Olander | 296/97 C |
| 3,550,187 | 12/1970 | Swartz | 16/335 X |
| 3,556,585 | 1/1971 | Binder | 296/97 K |
| 3,617,088 | 11/1971 | Graham | 296/97 C |
| 3,649,068 | 3/1972 | Moynihan | 296/97 C |
| 3,865,428 | 2/1975 | Chester | 296/97 G |
| 4,130,317 | 12/1978 | Lai | 296/97 R |
| 4,148,519 | 4/1979 | Hollar, Jr. | 296/97 H |
| 4,169,552 | 10/1979 | Lichtenstein et al. | 296/97 C |
| 4,248,473 | 2/1981 | Hildebrand | 296/97 G |
| 4,272,118 | 6/1981 | Viertel et al. | 296/97 R |
| 4,323,275 | 4/1982 | Lutz | 296/97 G |
| 4,362,330 | 12/1982 | Cramer | 296/97 F |
| 4,364,598 | 12/1982 | Viertel | 296/97 K |
| 4,394,043 | 7/1983 | Moulding et al. | 296/97 H |
| 4,469,367 | 9/1984 | Kuttler et al. | 296/97 K |
| 4,500,131 | 2/1985 | Fleming | 296/97 K |
| 4,617,699 | 10/1986 | Nakamura | 296/97 K X |
| 4,681,363 | 7/1987 | Hamaeke et al. | 296/97 G |

FOREIGN PATENT DOCUMENTS

| | | | |
|---|---|---|---|
| 36659 | 9/1926 | Denmark . | |
| 1396360 | 3/1965 | France . | |
| 2497157 | 2/1982 | France | 296/97 K |
| 639882 | 3/1962 | Italy | 296/97 J |
| 58-63517 | 4/1983 | Japan | 296/97 H |
| 1354485 | 5/1974 | United Kingdom | 296/97 K |

Primary Examiner—Dennis H. Pedder
Attorney, Agent, or Firm—Price, Heneveld, Cooper, DeWitt, & Litton

[57] ABSTRACT

A pair of visor mounting brackets include spring clips which cooperate with the pivot axles of a visor to selectively urge the visor toward a raised stored position and hold it in such position. The visor in a preferred embodiment includes a pair of panels with a first panel mounted to the brackets to be spring-actuated to a raised stored position and a second panel slidably mounted to the first panel by interlocking arms which permit the second panel to be extended from either side of the first panel.

6 Claims, 3 Drawing Sheets

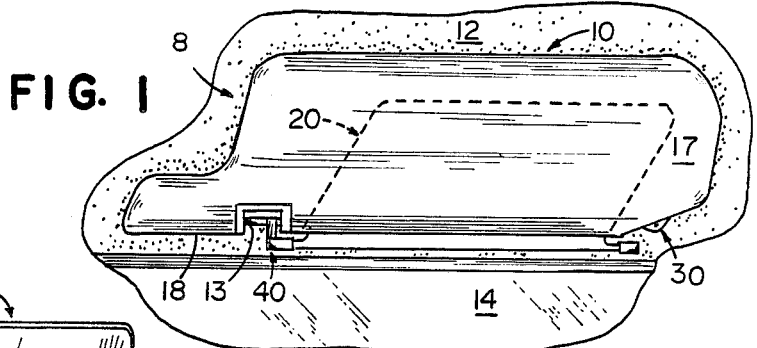
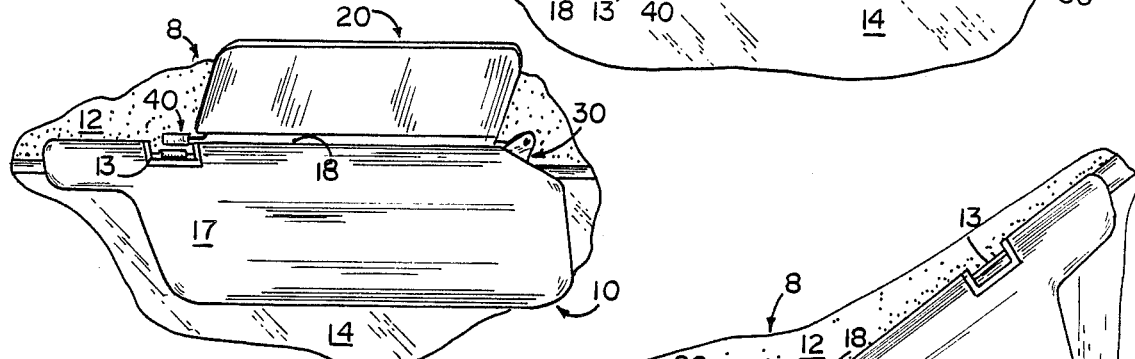
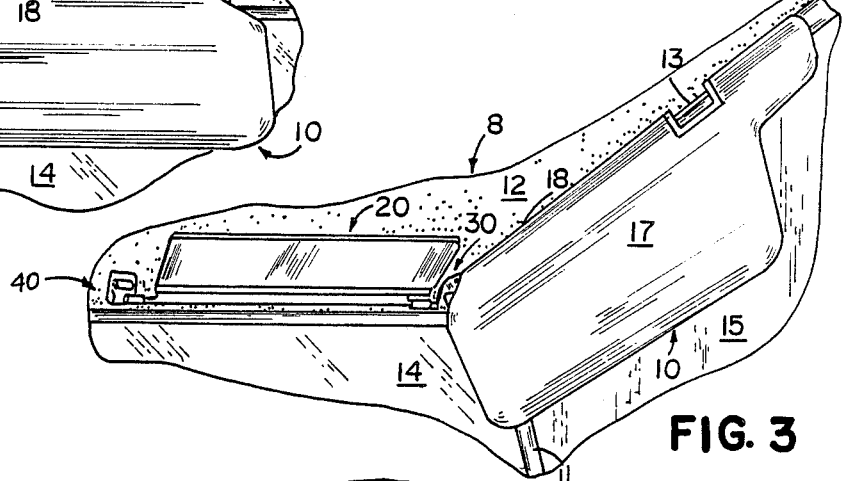
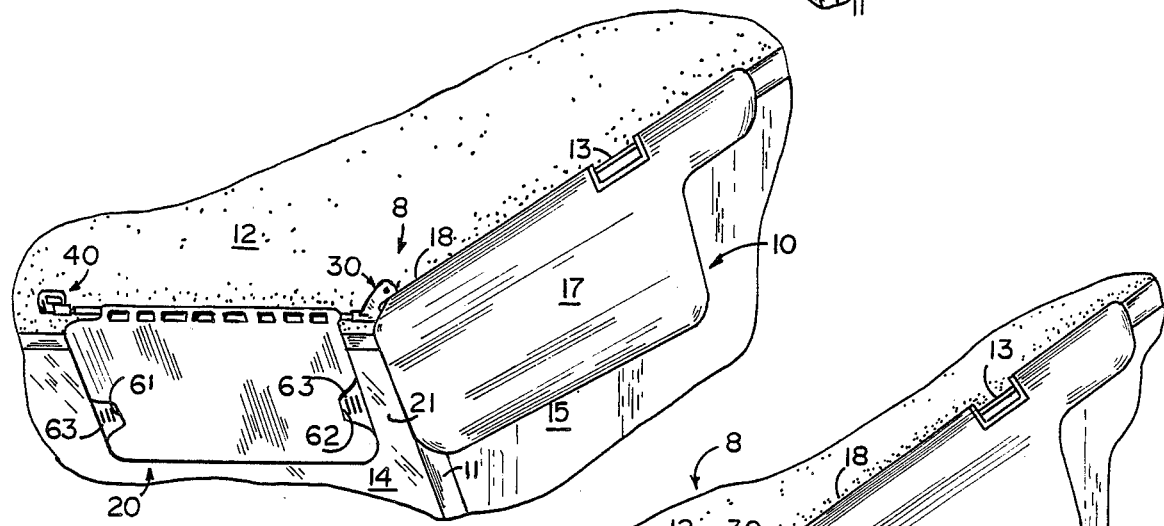
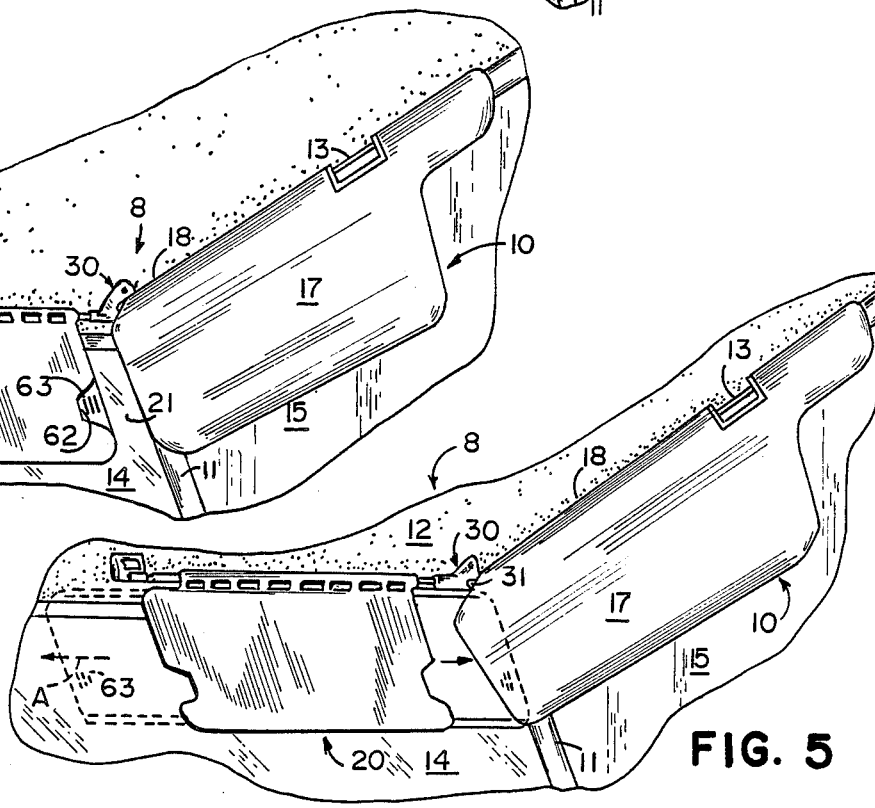

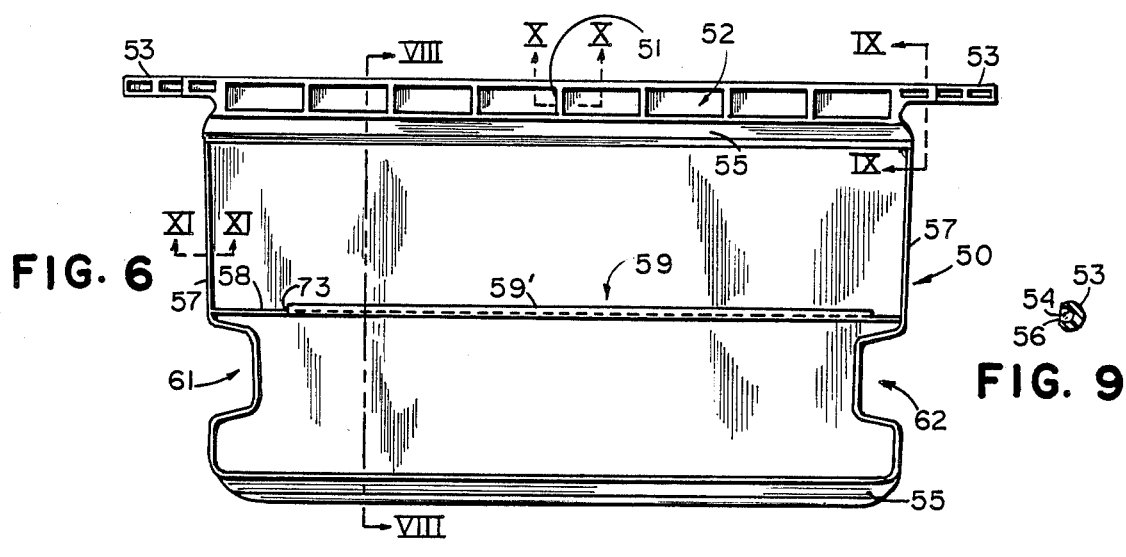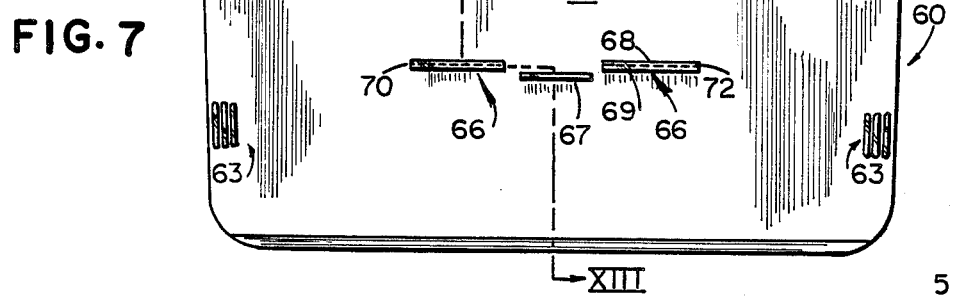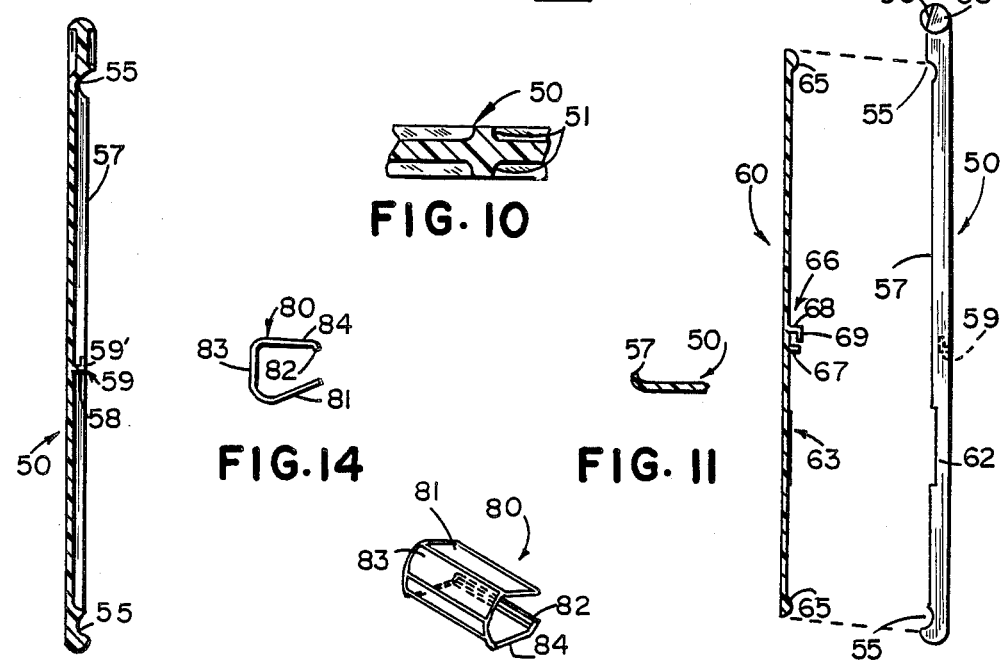

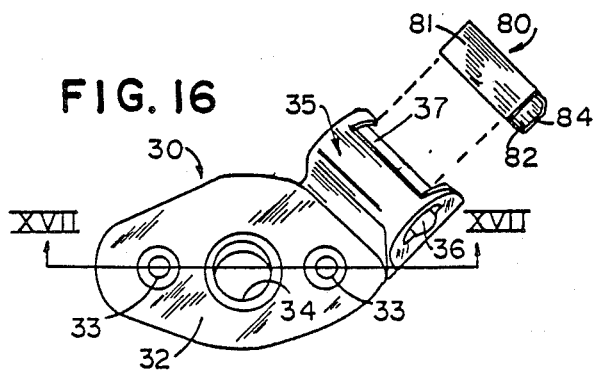
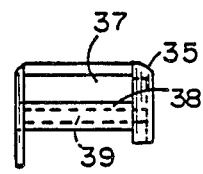
FIG. 16
FIG. 18
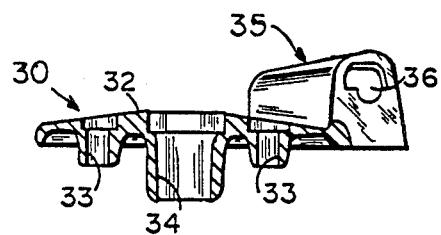
FIG. 17
FIG. 22
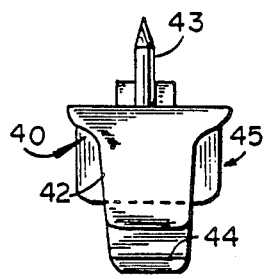
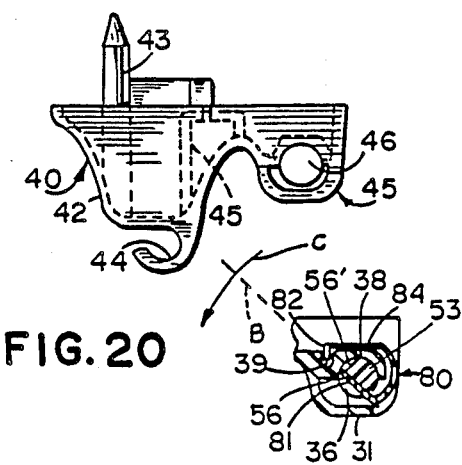
FIG. 19
FIG. 20
FIG. 21

VISOR

BACKGROUND OF THE INVENTION

The present invention pertains to vehicle visors and particularly to a mounting system for a visor.

Conventional automotive visors are installed such that they can pivot from a lowered use position adjacent the windshield to a side window if the sun is centering the vehicle from the side. When driving along a curved highway, it may be necessary to frequently move the visor from the windshield to the side window position while driving. This can not only be burdensome, but when ducking under the visor as it is moved, the driver's attention is distracted, creating a potentially hazardous driving situation.

In order to provide simultaneous side and front window shade, visor systems have been proposed which employ a primary conventional visor and a secondary or auxiliary visor. U.S. Pat. Nos. 2,261,881; 2,492,074; 2,517,872; 2,823,950; and 3,499,679 are representative of such structure. In these structures, an auxiliary visor is provided and is coupled directly to the primary visor through a pivot connection such that it can be moved to a variety of locations providing sun blocking along more than one axis of incident sunlight. Some prior art suggests providing conventional visors with sliding sleeves for blocking sunlight. U.S. Pat. Nos. 3,617,088 and 3,649,068 are representative of this "add-on" approach. Other visor systems provide separate side window visors which are permanently mounted above the side windows. U.S. Pat. No. 4,468,062, assigned to the present assignee, is representative of a side window visor installation.

SUMMARY OF THE PRESENT INVENTION

The present invention provides improved visor mounting brackets which in one embodiment support at least one visor panel for spring-actuated, snap-up storage against a vehicle roof. In the preferred embodiment, the mounting brackets adjustably support a first visor movable between a raised stored position and a lowered use position. The visor also can be moved to a side window for providing protection against incident light from the side. The brackets also include bias means which cooperate with the pivot axle of an auxiliary visor which is selectively urged by the bias means toward a raised stored position and releasably held in such position. The auxiliary visor preferably includes a pair of panels with a first panel mounted to the brackets to be spring-actuated to a raised stored position and a second panel slidably mounted to the first panel by interlocking arm means which permit the second panel to be extended from either side of the first panel.

With such a system, the auxiliary visor can become the primary windshield visor with the sliding panel selectively movable to either side to block light while the primary visor is moved to the side window position. Alternatively, when only a front visor is necessary, the primary visor can be used independently of the auxiliary visor. The system provides a compact and attractive visor installation which has the clean, trim appearance of a single visor installation and improved flexibility and operation. These and other features, objects and advantages of the present invention will become apparent upon reading the following description thereof together with reference to the accompanying drawings in which:

BRIEF DESCRIPTION OF THE DRAWINGS

FIG. 1 is a front elevational view of a passenger side visor installation embodying the present invention shown with both visor panels in a raised stored position;

FIG. 2 is a front elevational view of the structure shown in FIG. 1 with the primary visor shown in a lowered, forward windshield use position;

FIG. 3 is a front elevational view of the structure shown in FIG. 1 shown with the primary visor lowered and pivoted to cover the side window for use in blocking light incident from the side of the vehicle;

FIG. 4 is a front elevational view of the structure shown in FIG. 1 with the primary visor shown in the position shown in FIG. 3 and the auxiliary visor shown in a lowered use position;

FIG. 5 is a front elevational view of the structure shown in FIG. 4 with the sliding panel associated with the auxiliary visor extended to the right shown in solid lines or alternatively to the left—as shown in phantom lines;

FIG. 6 is an enlarged front elevational view of the inside of the auxiliary visor body;

FIG. 7 is a front elevational view of the inside of the sliding panel associated with the auxiliary visor body shown in FIG. 6;

FIG. 8 is a cross-sectional view of the auxiliary visor body taken along section line VIII—VIII of FIG. 6;

FIG. 9 is a cross-sectional view of the right end visor rod taken along section line IX—IX in FIG. 6;

FIG. 10 is an enlarged fragmentary cross-sectional view of the top edge of the auxiliary visor body taken along section line X—X of FIG. 6;

FIG. 11 is an enlarged fragmentary cross-sectional view of a side edge of the auxiliary visor body taken along section line XI—XI of FIG. 6;

FIG. 12 is a right side elevational view of the structure shown in FIG. 6;

FIG. 13 is a cross-sectional view of the visor panel taken along section line XIII—XIII of FIG. 7;

FIG. 14 is an end view of a spring clip employed in mounting the auxiliary visor body to the mounting brackets;

FIG. 15 is a perspective view of the clip shown in FIG. 14;

FIG. 16 is an exploded plan view of the right side mounting bracket and clip shown in FIGS. 1-5;

FIG. 17 is a cross-sectional view of the bracket taken along section line XVII—XVII of FIG. 16;

FIG. 18 is a right end elevational view of the visor rod and clip receiving portion of the bracket shown in FIG. 17;

FIG. 19 is a front elevational view of the left side visor mounting bracket shown in FIGS. 1-5;

FIG. 20 is a right side elevational view of the bracket shown in FIG. 19;

FIG. 21 is an inverted fragmentary cross-sectional assembly view of the visor rod receiving portion of the bracket shown in FIGS. 16-20 and an installed clip shown in FIGS. 14 and 15;

FIG. 22 is an enlarged fragmentary cross-sectional view of the auxiliary visor body and panel showing the interlocking arms.

DETAILED DESCRIPTION OF THE PREFERRED EMBODIMENT

Referring initially to FIGS. 1-5, there is shown the preferred embodiment of the invention which is shown installed in a vehicle on the passenger side. The visor system 8 of the present invention comprises a first or primary visor 10 and a second or auxiliary visor 20. Both visors 10 and 20 are coupled between a first mounting bracket 30 and a second mounting bracket 40 which are mounted in spaced relationship to the roof 12 of a vehicle above its windshield 14. In the embodiment shown, the passenger side visor system is mounted to the left of the "A" pillar 11 of the vehicle which extends between the windshield 14 and the right side window 15.

As seen in the progression of visor positions, shown in FIGS. 1-5, the first visor 10 operates in the nature of a conventional visor, movable between a raised stored position, shown in FIG. 1, to a lowered windshield position, as illustrated in FIG. 2. The visor can then be moved to a side window blocking position shown in FIGS. 3-5. The second or auxiliary visor panel 20 is held by spring clips in brackets 30 and 40 in a raised stored position against the roof 12 and can be lowered for use as illustrated in FIGS. 4 and 5. When both visors 10 and 20 are in a raised stored position, as illustrated in FIG. 1, the auxiliary visor 20 is concealed between visor 100 and roof or headliner 12 of the vehicle; and, therefore, the system appears substantially the same as a conventional visor installation. Having briefly described the operation of the visor system, a detailed description of the unique visor system is now presented.

The first or primary visor 10 may include an illuminated mirror package of the type described in U.S. Pat. No. 4,227,241 or a slide-out illuminated vanity mirror package as described in U.S. Pat. No. 4,486,819. Alternatively, the visor can be a standard blank visor as illustrated. Visor 10 includes a polymeric core covered by a suitable upholstery material 17 to conform the visor to the interior decor of the vehicle in which it is installed. A visor pivot rod extends within the visor core adjacent the top edge 18 thereof to permit the visor to pivot on the visor rod for movement between a raised stored position and a lowered use position as illustrated in FIGS. 1 and 2, respectively. The visor pivot rod and its connection within the body of a visor such as visor 10 is disclosed in detail in U.S. Pat. No. 4,500,131 entitled VISOR CONTROL, the disclosure of which is incorporated herein by reference. The visor pivot rod is itself conventional and forms no part of the present invention other than providing a pivotal interface between the visor body 10 and the pivot rod extending from an end thereof which includes an elbow which is pivotally coupled to mounting bracket 30.

The auxiliary visor 20 of the preferred embodiment of the invention includes a visor body 50 (FIG. 6) which slidably receives an auxiliary sliding panel 60 (FIG. 7) which can be moved from a stored position illustrated in FIG. 4, substantially coextensive and aligned with body 50, to a first extended position, illustrated in FIG. 5 in solid lines, in which the auxiliary panel 60 extends immediately adjacent to the "A" pillar 11 of the vehicle, filling in the gap 21 shown in FIG. 4. Panel 60 can also be moved to the left as indicated by arrow A in FIG. 5 and as shown in phantom lines. Thus auxiliary visor 20 provides an adjustable width visor with a bilaterally sliding panel to selectively block direct sunlight or reflections as required. The construction of the auxiliary visor 20 comprising body 50 and auxiliary sliding panel 60 is now described particularly in conjunction with FIGS. 6-13.

Both body 50 and sliding panel 60 are generally rectangular shaped, as seen in FIGS. 6 and 7, and preferably are integrally molded of an opaque suitable polymeric material such as polycarbonate. Body 50 integrally includes, along its upper edge, a section defining a pivot rod 52 with a plurality of spaced integral ribs 51 (FIG. 10). Rod 52 terminates at opposite ends in D-shaped cross section stub axles 53 which, as described below, fit within keyed openings of each of the brackets 30 and 40 and is engaged by the spring clips 80, shown in FIGS. 14 and 15, for urging and holding visor 20 in the stored position shown in FIGS. 1-3 as the visor is manually rotated toward and to within about 30° of its stored position. It is noted here that FIGS. 6 and 7 show the inside facing surfaces of members 50 and 60 with the outside surfaces being shown in FIGS. 4 and 2, respectively.

Body 50 also includes a pair of spaced generally parallel semicylindrical guide channels 55 formed inwardly from but near the top and bottom edges of the body as best seen in FIGS. 6 and 12. Guide channels 55 receive complementary shaped parallel projections 65 on panel 60 for guiding, partially supporting, and aligning panel 60 with respect to body 50 as it slides between its adjusted positions. As seen in FIG. 6, the channels 55 extend the full width of body 50.

As best seen in FIG. 9, each of the end posts 53 can include a plurality of spaced reliefs 54 with the peripheral edges, however, defining a flat 56 which aligns with the spring clip section 81 when the visor is in a raised stored position (FIG. 21) and the edges of which cam the visor toward the stored position as described in greater detail below. The opposite peripheral edges of the body 50 include a reinforcing lip 57, as best seen in FIG. 11, to add rigidity to the body. Edges 57 also serve as stop means in cooperation with sliding panel 60 to limit the lateral extension of the sliding panel by engaging the outer edges 70 and 72 of the interlocking arms 66 as seen in FIG. 7.

Approximately along the longitudinal centerline of body 50 there is provided an L-shaped arm 59, as best seen in FIG. 8, having a horizontally outwardly extending segment 58 which extends between lips 57, as best seen in FIG. 6, and a vertically upwardly extending segment 59' which extends partially the width of body 50. As seen in FIG. 6, segment 59' terminates at a greater distance from the left end, as viewed in FIG. 6, than it does at the right end to define a slot 73 to permit assembly of the panel 60 to the body 50 as described in greater detail below. The function of member 59 comprising integral elements 58 and 59' is twofold. The elongated outer surface of member 58 engages the inner surface 64 of panel 60 to provide sliding support therebetween and prevent rattling between the two panel-shaped members while the vertically extending segment 59' interlocks with the locking arm means of panel 60 for holding the two elements together. The side edges of body 50 includes notches 61 and 62 which provide access to the thumb tabs 63 of the sliding panel 60.

The sliding panel 60 is also a generally flat rectangular panel like body 50 and, as previously indicated, includes upper and lower longitudinally extending parallel spaced rounded projections 65 which are of complementary dimension and shape to channels 55 and slidably fit therein for guiding the edges of panel 60 along the inner surface of body 50. Panel 60 includes three vertically extending spaced parallel raised projections 63 located along the edge near the lower half of the panel and which, as seen in FIG. 4, are positioned in alignment with the notches 61 and 62 to permit easy gripping of the edges of panel 60 for sliding the panel with respect to the body 50. On the inner surface 64 of panel 60, there is provided interlocking arms comprising a pair of downwardly projecting L-shaped arms 66 positioned in spaced relationship along the general longitudinal centerline panel 60 with a straight rectangular bar 67 positioned therebetween and in horizontally spaced relationship as best seen in FIG. 7. Each of the downwardly depending L-shaped arms 66 includes an outwardly projecting segment 68 and a downwardly projecting segment 69 with adjacent outer ends 70 and 72 which, when installed as described below, selectively engage lips 57 on body 50 to limit the travel of the panel 60 so that it does not become disengaged from body 50 during use.

The length of each of the members 66 in the preferred embodiment was approximately 1.4 inches for panel 60 which has an overall width of 11 inches, and the width is selected such that the downwardly extending lip 69 of the left arm 66, as viewed in FIG. 7, will fit within the notch 73 (FIG. 6) between lip 57 of body 50 and the end of arm 59 and particularly leg 59' thereof for assembly of the two panels. Bar 67 positioned intermediate arms 66 engages a side opposite the outwardly extending segment 58 of arm 59, as best seen in FIG. 22, with the L-shaped arm 66 interlocking with arms 59, as also best seen in FIG. 22, which is a cross-sectional view through one of the members 66 with the panel 60 installed on body 50. Sufficient clearance is provided to assure that the desired interlocking and, therefore, holding of the two panels with their interfaces adjacent one another is provided and yet smooth sliding operation is permitted with rattle-free operation assured also by the guide channels 55 cooperating with projections 65.

The assembly of panel 60 to body 50 is provided by facing the inner surfaces of the two members and aligning the left arm 66 (as viewed in FIG. 7) with notch 73 and sliding the panel until the arm 66 interlocks with arm 59. Subsequently, sliding panel 60 is moved with respect to body 50 until bar 67 slides under leg 58. The somewhat flexible panel 60 is advanced until the second arm 66 interengages arm 59 and the edge 72 of the second leg 66 of panel 60 clears lip 57 after which both panels assume their normal undeflected configuration, and edges 70 and 72 will selectively engage lips 57 to limit the subsequent opposed sliding motion of panel 60 within body 50. Once assembled, typically there is no need to disassemble the panel 60 from body 50; however, it can be achieved by pulling the panel 60 toward gap 73 and lifting edge 72 above lip 57 and subsequently sliding panel 60 outwardly therefrom while raising it away from body 50. The guide channels 55 may alternatively be formed as panel 60 with the projections 65 on body 50 as long as the sliding guiding interface is provided. Also, any generally concave and convex shape other than the preferred semicylindrical shape can be employed as long as sufficient depth for interengagement is provided to resist skewing of panel 60 from body 50 away from the longitudinal axis of these elongated members. The assembled visor 20 is mounted to the unique mounting brackets and spring clips of the present invention to provide the snap-up storing and holding operation now described in connection with FIGS. 14–21.

Mounting bracket 30 is cast or molded of a suitable material such as a zinc alloy. Bracket 30 includes a body 32 having a pair of recessed stepped mounting apertures 33 spanning opposite sides of a tapered central aperture 34 for receiving the elbow end 31 (FIG. 5) of the visor pivot rod for visor 10. The elbow end is held within the tapered aperture 34 by conventional means such as a spring and locking nut. Integrally molded to body 32 is a rod end and spring clip receiving boss 35 which is aligned when bracket 30 is secured to the vehicle, as shown in FIGS. 1–5, to be above and generally parallel to the upper edge of windshield 14 with a centrally extending longitudinal configurated aperture 36 shaped to receive one of the spring mounting clips 80 through a slot 37 formed laterally of aperture 36 and communicating therewith as best seen in FIG. 18. Boss 35 includes a lower support floor 38 which includes, as perhaps best seen in the installed inverted view of FIG. 21, an elongated ledge 39 formed therein over which the locking edge 82 of clip 80 is extended for holding the clip to the bracket.

Clip 80 (FIGS. 14–16) is a generally C-shaped clip made of spring metal and having a length of approximately one inch with a first generally flat end segment 81 which extends across a chordal segment of the generally cylindrical aperture 36, as best seen in FIG. 21, to engage the flat surface 56 of the stub axle 53 which is extended within the aperture 36. Segment 81 integrally is coupled by curved wall 83 and top wall 84 to the locking edge 82, in a generally C-shaped configuration as best seen in FIG. 14. The clip is installed, as illustrated in FIG. 16, by sliding the clip forwardly into the slot 37 with surface 81 extending under the top surface 31 of boss 35 and with the lower leg 84 extending over support leg 38 until locking lip 82 snaps over ledge 39 to hold the clip in place.

Mounting bracket 40 is molded of a resilient polymeric material such as a polycarbonate and includes a mounting boss 45 which is of substantially identical construction but which has an opening 46 which faces toward and is axially aligned with opening 36 in bracket 30 when the brackets are installed. Bracket 40 includes a front section 42 which includes an open elongated cylindrical socket 44 for releasably receiving the secondary support rod 13 of the primary visor 10 as seen in FIGS. 1–5. The base of bracket 40 includes a locator pin and flange 43 which extends within an aperture formed in the sheet metal portion of roof 12 and a recessed screw receiving aperture 45 for conventionally securing bracket 40 to the roof of the vehicle. Clip receiving boss 45 other than having opening 46 is an opposite direction as boss 35 of bracket 30 is of substantially identical construction, and reference to FIGS. 18 and 21 is had for the relationship of the structural elements thereof to receive a clip 80 which is similarly positioned within clip receiving boss 45 of bracket 40.

With spring biasing clips 80 located in each of the brackets 30 and 40, the brackets are positioned over the stub ends 53 of visor 20; and with visor 30 attached to the brackets, the system is ready for installation in a vehicle. As best seen in FIG. 21, which shows the mounting boss 35 or 45 in the position in which it would be installed in a vehicle, the flat 56 on the left stub axle 35 of the visor 20 is shown which cooperates with spring clip leg 81 to hold the visor in the plane indicated by dashed line B which is approximately the angle of the roof line 12 above windshield 14. As can be appreciated, as the visor 20 is lowered by rotation in a counterclockwise direction, as shown in FIG. 21 by arrow C, the upper left corner 56' of stub axle 53 urges against leg 81 of clip 80 expanding the clip which provides a compressive force against the remaining cylindrical surface of axle 53 for holding the visor 20 in a selected lowered position. As the visor is returned toward the stored position against the vehicle headliner, the now expanded spring clip 80 provides a force against the edge 56' of each of the stub axles 53 which tends to rotate the visor in a direction opposite arrow C toward the stored position indicated by plane B in FIG. 21. Thus, with the mounting brackets of the present invention, the auxiliary visor 20 is urged toward the stored position, illustrated in FIGS. 1-3, and held in the stored position by the resilient spring clips 80.

Once the primary visor 10 is lowered and moved to the side, as shown in FIG. 3, the auxiliary visor 20 can be lowered from its stored position, as seen in FIGS. 1-3, in which it is hidden behind visor 10 when stored, to a lowered use position as shown in FIG. 4. The auxiliary visor panel 60 can be extended to either side as necessary to fill gap 21 between visors 10 and 20 or between the vehicle's rearview mirror and body 50 by grasping tabs 63 and extending panel 60 as shown in FIG. 5. Thus the use of panel 60 effectively provides a variable width auxiliary visor 20 which cooperates with the primary visor to block incident light from interferring with the driver's or passenger's vision. Although a passenger side installation is shown, it is understood that the driver's side installation is essentially the same with the parts reversed.

It will become apparent to those skilled in the art that various modifications of the preferred embodiment of the invention can be made without departing from the spirit or scope of the invention as defined by the appended claims.

The embodiments of the invention is which an exclusive property or privilege is claimed are defined as follows:

1. A visor system for a vehicle comprising:
a pair of brackets adapted to be mounted in spaced relationship above a vehicle window;
a visor including a planar body made of a rigid polymeric material and means for slidably mounting a panel to said body, said means including track means for slidably receiving a panel, and a panel made of a rigid polymeric material, said panel slidably mounted within said track means of said body for sliding movement along an axis parallel to the longitudinal axis of said visor between a stored position at least partially aligned with said body and use positions extended from a side of said body, wherein said means for slidably mounting said panel to said body further includes interlocking arm means extending from facing surfaces of said body and said panel and engaging one another to hold said panel and body together; and
means for mounting said visor between said brackets for permitting said visor to be moved between a raised stored position adjacent the vehicle roof and a lowered use position adjacent the vehicle window.

2. A visor system for a vehicle comprising:
a pair of brackets adapted to be mounted in spaced relationship above a vehicle window;
a visor including a planar body and a panel slidably mounted to said body for sliding movement along an axis parallel to the longitudinal axis of said visor between a stored position at least partially aligned with said body and use positions extended from either side of said body; and
means for mounting said visor between said brackets for permitting said visor to be moved between a raised stored position adjacent the vehicle roof and a lowered use position adjacent the vehicle window, wherein said means for slidably mounting said panel to said body includes interlocking arm means extending from facing surfaces of said body and said panel and engaging one another to hold said panel and body together and wherein said means for slidably mounting said panel to said body further includes a generally concave channel means formed in one of said body and panel along the direction of sliding movement of said panel and a complementary generally convex projection means formed in the other of said body and panel for engaging said channel to provide a sliding guide therebetween.

3. The apparatus as defined in claim 2 wherein said concave guide channel means and convex projection means are semicylindrical.

4. The apparatus as defined in claim 3 wherein said channel means comprises a pair of spaced parallel semicylindrical channels and said projection means comprises a pair of semicylindrical projections extending in alignment with said channels.

5. The apparatus as defined in claim 4 wherein said channels and projections are formed adjacent opposite edges of said visor.

6. The apparatus as defined in claim 5 wherein said channels are formed in said body and said projections are formed in said panel.

* * * * *